US009103670B1

(12) United States Patent
Ekchian (10) Patent No.: US 9,103,670 B1
(45) Date of Patent: *Aug. 11, 2015

(54) METHOD AND APPARATUS FOR HYSTERESIS REDUCTION IN DISPLACEMENT SENSORS

(71) Applicant: Jack A. Ekchian, Belmont, MA (US)

(72) Inventor: Jack A. Ekchian, Belmont, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/969,851

(22) Filed: Aug. 19, 2013

Related U.S. Application Data (63) Continuation-in-part of application No. 13/065,789, filed on Mar. 30, 2011, now Pat. No. 8,510,966.

(60) Provisional application No. 61/341,351, filed on Mar. 30, 2010.

(51) Int. Cl.
*G01C 9/16* (2006.01)
*G01C 9/18* (2006.01)
*G01C 9/06* (2006.01)

(52) U.S. Cl.
CPC .. *G01C 9/18* (2013.01); *G01C 9/06* (2013.01); *G01C 2009/062* (2013.01); *G01C 2009/068* (2013.01); *G01C 2009/182* (2013.01); *G01C 2009/185* (2013.01)

(58) Field of Classification Search
USPC ......... 33/356, 357, 358, 359, 366.13, 366.15, 33/366.19, 366.25
See application file for complete search history.

(56) References Cited

U.S. PATENT DOCUMENTS

| | | | | |
|---|---|---|---|---|
| 5,010,653 | A * | 4/1991 | Fowler | 33/356 |
| 5,992,932 | A * | 11/1999 | Kain et al. | 297/153 |
| 7,188,426 | B2 * | 3/2007 | Barr | 33/366.19 |
| 8,510,966 | B2 * | 8/2013 | Ekchian | 33/366.13 |
| 8,800,155 | B2 * | 8/2014 | Ekchian | 33/366.15 |
| 2010/0121599 | A1 * | 5/2010 | Boeve et al. | 33/356 |

* cited by examiner

*Primary Examiner* — G. Bradley Bennett (57) ABSTRACT

A method and apparatus are provided for improving the performance of displacement sensors, including absolute displacement sensors, such as inclinometers and accelerometers, and relative displacement sensors such as linear relative position transducers, by reducing or eliminating hysteresis. During use, independent, controlled and limited displacement is induced between the sensing unit and housing or base of such sensors.

21 Claims, 10 Drawing Sheets

(Prior Art)

METHOD AND APPARATUS FOR HYSTERESIS REDUCTION IN DISPLACEMENT SENSORS

CROSS-REFERENCE TO RELATED APPLICATIONS

The present application is a continuation in part of U.S. application Ser. No. 13/065,789, filed Mar. 30, 2011, now U.S. Pat. No. 8,510,966 and claims priority thereto. This application also claims priority to U.S. Provisional Patent Application No. 61/341,351, entitled "Sensors with reduced hysteresis", filed Mar. 30, 2010. The contents of the patent and patent applications, referenced above, are incorporated herein by reference, in their entirety.

FIELD OF INVENTION

The present invention generally relates to a method and apparatus for reducing hysteresis in displacement sensors such as, for example, inclinometers, accelerometers and linear position transducers. More particularly, the invention relates to such a method and apparatus wherein controlled and constrained motion is imparted to the sensor's sensing unit relative to the sensor base or housing during use.

BACKGROUND

The performance of sensors, such as displacement sensors, is frequently degraded by hysteresis. Displacement sensors may be absolute displacement sensors such as certain inclinometers and accelerometers that measure the inclination or acceleration of the housing or enclosure of the sensor relative to the earth or other inertial reference frame. Frequently, the same sensor may be used as an inclinometer and an accelerometer. Displacement sensors may also be used to measure the relative displacement between two or more points. Such relative displacement sensors may be physically connected to or in contact with such points or may rely on, for example, magnetic or electric fields or electromagnetic or acoustic waves to link to such points.

Absolute displacement sensors, such as for example inclinometers, typically comprise a base and certain sensing elements, within a sensing unit, that are immovably connected to the base. Such displacement sensors also contain certain sensing elements, within the sensing unit, that may move relative to the base as a result of motion that is imparted to the base. The relative motion between these two types of sensing elements within the sensing unit is typically measured and used to determine the displacement of the base.

If an ideal error-free displacement sensor, such as a single axis inclinometer with sufficient range and without hysteresis, underwent exactly a 25 degree clockwise (CW) change in inclination about its sensitive axis followed by a counterclockwise (CCW) change in inclination of exactly 25 degrees about the same axis, the sensor would indicate a net change in inclination of precisely zero degrees. However, at least due to hysteresis, conventional inclinometers typically cannot perform in this manner.

The present applicant was a co-inventor of an invention described in U.S. Pat. No. 4,624,140, the contents of which are included herein by reference in their entirety. An inclinometer disclosed in that patent comprises a sensing unit comprising a spherical vessel, partially filled with a conductive liquid and with conductive wall segments at least one of which is coated with a thin dielectric coating. In use, when the inclination of such an inclinometer is varied, the conductive liquid covers a variable portion of at least one dielectric coated wall segment. The capacitance between the conductive liquid and the coated wall segment varies as a function of the inclination of the base of the device. An alternate capacitive sensor, which uses a low conductivity liquid as the dielectric of a capacitor, is disclosed in U.S. Pat. No. 3,906,471, the contents of which are included herein by reference in their entirety. U.S. Pat. Nos. 4,503,622; 4,854,047; 4,912,662; 5,083,383; 6,490,920; 6,516,527; and 7,886,451, the contents of which are included herein by reference in their entirety, also describe other configurations of inclinometers. U.S. Pat. Nos. 3,721,010 and 5,682,682, the contents of which are included herein by reference in their entirety, describe related displacement sensors that measure the distance or the change in distance between two points. Generally, the accuracy of inclinometers and other displacement sensor technologies, with and without liquid sensing elements, is limited by hysteresis.

The sensing units in displacement sensors typically have components that are immovably fixed relative to the housing or base of the sensor and other components that are free to move or have the propensity to move relative to the housing or base when the sensor is displaced. The relatively fixed elements in the sensing unit of the inclinometer disclosed in U.S. Pat. No. 4,624,140 comprise the vessel and the conductive wall segments. The conductive liquid, on the other hand, is a movable element within the sensing unit that moves relative to the housing of the sensor or the sensor base when the housing and base are displaced.

The contents of co-pending U.S. Pat. App. 2012/0266470 are incorporated herein by reference in their entirety.

Displacement sensors are typically configured to be sensitive to a single input. For example, an inclinometer is typically configured to measure only changes in inclination of its base. Although, a two-dimensional sensor may be used to measure an inclination change in two dimensions, the only input that can typically be measured with such a device is change in inclination of the base or housing.

U.S. Pat. No. 1,637,445, the contents of which are included herein by reference in their entirety, describes the use of a liquid filled, shaft mounted, variable capacitor attached to a tuning knob of a radio. Such a device cannot be used as an inclinometer because the output of the variable capacitor is sensitive to two different inputs, namely the inclination of the base of the radio and the rotation of knob 25 in FIG. 1 of the U.S. Pat. No. 1,637,445. In such a device, the output of the capacitance is the result of an indeterminate combination of the inclination of the base and the rotation of the knob.

SUMMARY OF INVENTION

It is an object of the present invention to improve the accuracy of displacement sensors by reducing or eliminating errors caused by hysteresis.

It is another object of this invention to compensate for the error caused by hysteresis in the use of a displacement sensor.

Displacement sensors may be configured to measure absolute displacement relative to an inertial reference frame, such as, for example, the earth. Displacement sensors, such as inclinometers and accelerometers, are typically absolute displacement sensors. Alternatively displacement sensors may be configured to measure relative displacement between two or more objects, surfaces or points. Displacement sensors typically have sensing units that detect absolute quantities, i.e. for example absolute acceleration or inclination or relative quantities, such as for example relative distance or the change in relative distance. It is yet another object of this invention to configure a displacement sensor to produce a calibrated output that may be used to measure displacement, but which also comprises a mechanism for producing a prescribed determinate displacement, of the sensing unit of the sensor, relative to the sensor base or housing. The induced relative motion between the sensing unit and the sensor base is more preferably of a predetermined magnitude and timing which is automatically implemented. It is further preferred that the net induced motion of the sensing unit relative to the base or housing, prior to obtaining the final output reading, is zero. Therefore, it is preferable that the positions of the elements of the sensing unit that are normally "fixed" relative to the sensor base are returned to their original relative positions after the induced motion. Alternatively, if the net relative displacement is not zero, it is necessary that the net relative displacement and its effect on the sensor output be ascertainable. The base of an absolute displacement sensor is typically used to attach the sensor to or place the sensor against a surface the displacement or position of which is to be measured. Displacement sensors, such as inclinometers, may be placed against a surface to measure its absolute inclination. Alternatively, relative displacement sensors may be attached to two surfaces in order to measure the relative displacement between the two surfaces or points on those two surfaces.

An inclinometer may, for example, be configured so that in the case of changes in inclination of its base or housing about a sensitive axis, CW changes may be determined without any induced motion between the base and the sensing unit. In the case of CCW changes in inclination, mechanisms within the sensor housing may automatically cause the sensing unit to undergo a predetermined additional CCW change in inclination as determined by the sensing unit followed preferably by an equal amount of CW change relative to the sensor base. Preferably, once these predetermined induced changes are completed, a measurement of inclination of the base is obtained. In this manner, the motion of the sensing unit of such a sensor is always in the CW direction before the output reading is obtained, regardless of the overall direction of displacement of the sensor base. As a result, the effect of hysteresis is reduced or eliminated. It is preferred that the magnitude of the predetermined relative displacement internal to the sensor be at least equal to or greater than the maximum error that would otherwise be caused by hysteresis.

It is a further object of this invention to reduce or eliminate the effect of hysteresis by inducing vibration or oscillation of the sensing unit relative to the base or the absolute reference frame. It is preferred that the magnitude of oscillations be equal to or greater in magnitude than the maximum error due to the hysteresis. It is further preferred that the vibration or oscillation be stopped prior to obtaining an output reading from the sensor.

In an embodiment of the invention, an inclinometer is configured comprising an inclination sensing unit and a base. The base can be used to connect the sensor to a surface so that the inclination of the surface can be determined. The sensor further comprises an actuator that may be used to impart relative controlled motion between the sensing unit and the base. The motion is preferably of predetermined speed, duration, magnitude and overall direction.

In a further embodiment, a method for measuring the inclination of a surface is disclosed comprising: providing an inclination sensing unit, providing a base, placing the base on a surface, inducing relative motion between the sensing unit and the base, and obtaining an output measurement from the sensing unit. The sensing unit may comprise a liquid element that may be conductive. The conductive liquid may be an electrolyte.

It is a yet another object of this invention to directly induce a predetermined displacement to the normally movable components in the sensing unit relative to the sensor base prior to obtaining a reading from the sensor. For example, in the case of a liquid filled capacitive sensing unit as disclosed in U.S. Pat. No. 4,624,140, the conductive liquid may be agitated directly and independently of the motion of the sensor base in the sensing element as a whole.

Various features of one or more embodiments of the invention described herein may be used singularly or in combination with other features including features not described herein. The objectives indicated are not intended to be exhaustive.

DESCRIPTION OF FIGURES

The foregoing summary, as well as the description of the embodiments of the invention, will be better understood when read in conjunction with the appended drawings. For the purpose of illustrating the embodiments of the present inventions, and to explain their operation, drawings of preferred embodiments and schematic illustrations are shown. It should be understood, however, that the invention is not limited to the precise arrangements, variants, structures, features, embodiments, aspects, methods, advantages, improvements, and instrumentalities shown, and the arrangements, variants, structures, features, embodiments, aspects, methods, advantages, improvements, and instrumentalities shown and/or described may be used singularly in the device or method or may be used in combination with other arrangements, variants, structures, features, embodiments, aspects, methods, advantages, improvements, and instrumentalities.

DETAILED DESCRIPTION OF INVENTION

Figure 1A:
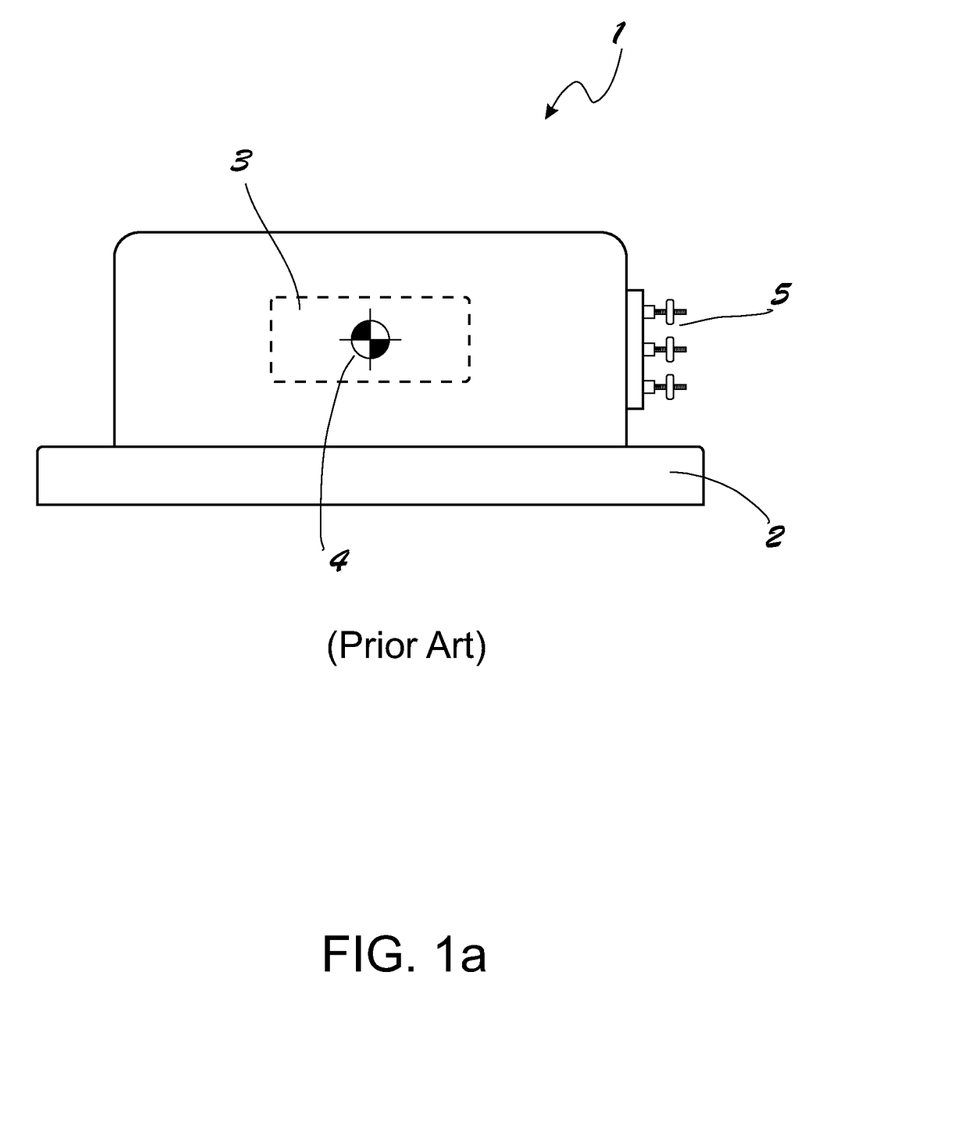
FIG. 1a is a schematic of a conventional displacement sensor with sensing unit.

FIG. 1a shows a conventional inclinometer 1 with base 2 and sensing unit 3 with axis of sensitivity 4 and terminals 5 for power input, ground and signal out. The base is typically used to attach the sensor to a surface of another object where the inclination of the surface is to be measured. The sensing unit is immovably attached to the base.

Figure 1B:
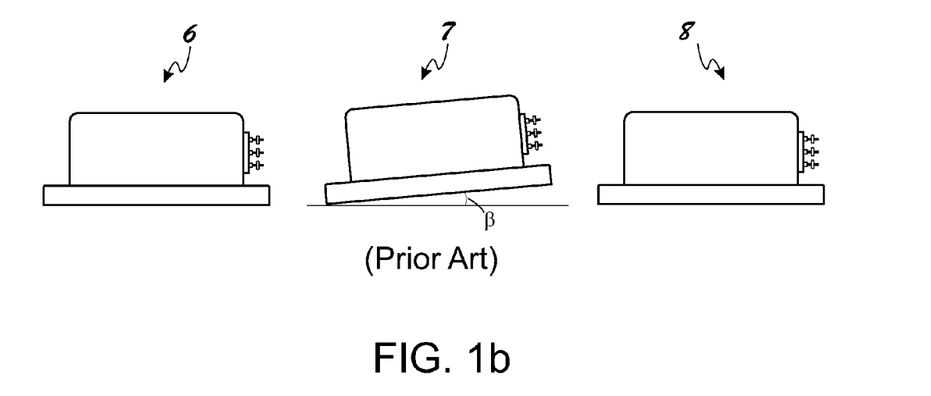
FIG. 1b shows the inclinometer of FIG. 1a undergoing a sequence of changes in inclination.
Figure 1C:
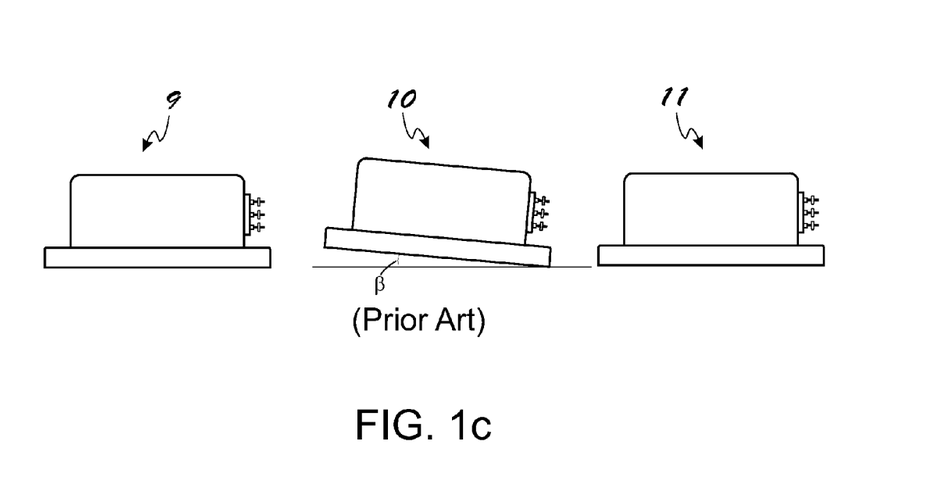
FIG. 1c shows the inclinometer of FIG. 1a undergoing another sequence of changes in inclination.

FIG. 1b shows the inclinometer of FIG. 1a undergoing a sequence of changes in inclination. It starts from a horizontal position 6, followed by a CCW or negative change of β degrees in position 7 and then returns to a horizontal position 8. Typically, the reading of the sensor output in position 8 does not return to the reading obtained in position 6 at least partly due to hysteresis. In FIG. 1c, the inclinometer again starts from a horizontal position 9 and undergoes a change of β degrees in the CW direction in position 10 and again returns to a horizontal position 11. Again, the reading in position 9 produced by an inclinometer typically does not match the reading in position 11. Even if the output of the sensor starts at the same value in positions 6 and 9, typically, the magnitude of the reading at position 7 compared to that at position 10 and the value at position 8 compared to that at position 11 will be different at least due to hysteresis. In fact, if the angle β is small enough, the output of the sensor in FIG. 1b may not change at all, due to hysteresis, as the sensor transitions between positions 6 and 7 and 7 and 8.

Figure 2:
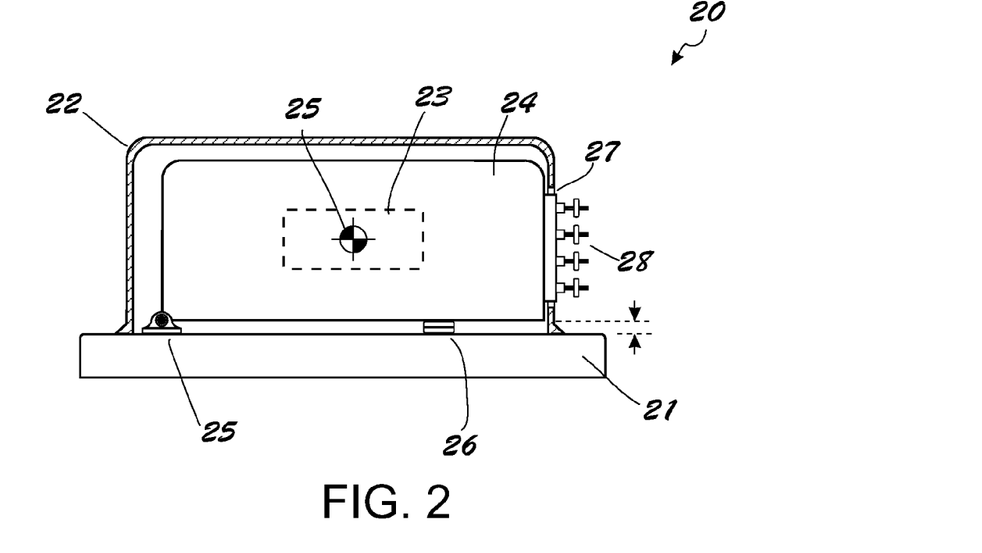
FIG. 2 is a schematic of an embodiment of the invention with an actuator for moving the sensing unit relative to the sensor base.

FIG. 2 is a schematic of an inclinometer configured according to the invention. Inclinometer 20 comprises a base 21, a housing 22, and a sensing unit 23 within assembly 24. Base 21 is configured to be attached, otherwise secured to or placed against a surface or object. Also shown is a pivot or hinge 25 which permits the assembly 24 and sensing unit 23 to be moved relative to the sensor base 21 and housing 22. The sensing unit 23 and assembly 24 may be rotated about the axis of sensitivity 25 even when the base and the housing remain fixed. It is preferred that the relative movement between the sensing unit 23 and the housing base 21 be controlled by actuator 26 which may be, for example, a piezoelectric stack, a cam mechanism, a worm gear drive or a rack and pinion device. The actuator may also comprise a linear or rotary drive with mechanical, electric pneumatic or hydraulic jacks, or a linear motor. Terminals 28 are configured to supply electrical power and to communicate with the sensing unit. Opening 27 in housing 22 is configured to allow assembly 24 and terminals 28 to be moved by actuator 26 without being obstructed.

The actuator may be used to minimize the effect of hysteresis by, for example, causing movement of the sensing unit relative to the base to always be in a predetermined direction just before an output reading is taken. It is preferred that the net motion induced by the actuator not add or subtract from the total displacement of the sensing unit as a result of the displacement of the base. It is further preferred that the change in position induced by the actuator also be of a predetermined magnitude such that the magnitude of its effect on the sensing unit output is equal to or larger than the maximum error otherwise due to hysteresis. The base may be located in any convenient position or orientation relative to assembly 24 and housing 22. The base 21 may be of any convenient shape for placing against or attaching to a surface of an object for measuring the object's inclination. For example, base 21 may be movably attached, for example by means of a hinge, to the side or top of assembly 24.

Figure 3:
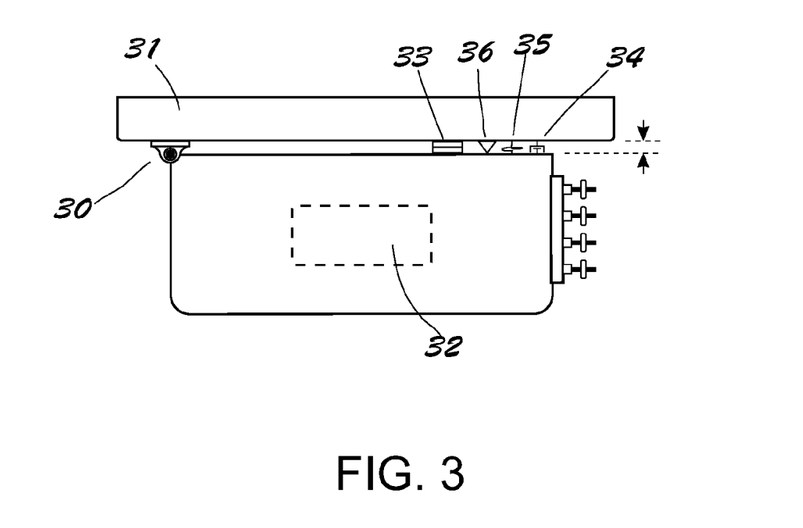
FIG. 3 is a schematic of another embodiment of the invention wherein the induced motion between the sensing unit and the base is controlled and constrained by components including a spring, a damper and a stop.

The motion of the sensing unit relative to the base may be limited or constrained by using stops so as to ensure that the net induced relative motion is exactly zero. FIG. 3 shows another embodiment of an inclinometer according to the present invention. The relative motion of the sensing unit 32 relative to the sensor base 31 may be constrained by a hinge 30, a damping mechanism 34, a spring mechanism 35 and a stop 36. Relative motion of the sensing unit 32 relative to base 31 is induced by actuator 33.

Figure 4A:
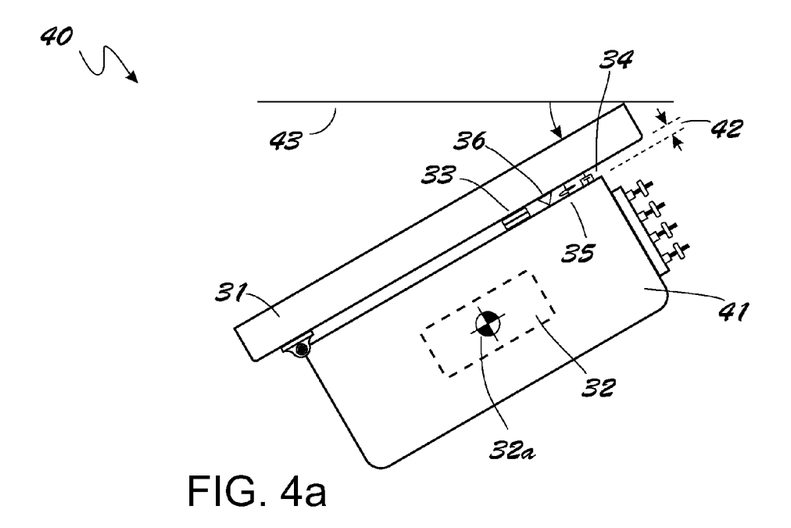
FIG. 4a is a schematic of the embodiment illustrated in FIG. 3 shown undergoing a CW displacement.

FIG. 4a shows an inclinometer with base 31, sensing unit 32, and axis of sensitivity 32a. The inclinometer base has undergone a rotation, or change in inclination, of 30° in the CCW or negative direction from horizontal position 43. In this embodiment, the base 31 and the assembly 41 that comprise the sensing unit 32 are held together and move as one piece during a CCW displacement. The actuator 33 remains inactive and spring 35 holds assembly 41 firmly against stop 36. Since the base 31 and assembly 41 move as one piece, distance "y" 42 remains unchanged.

Figure 4B:
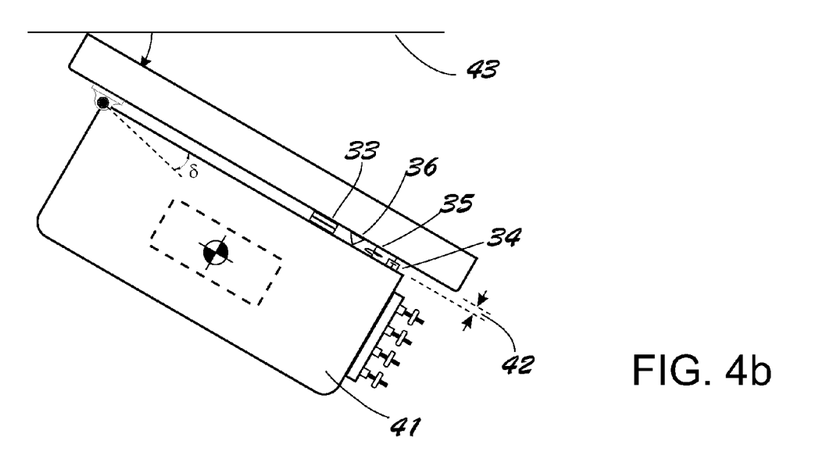
FIG. 4b is a schematic of the embodiment illustrated in FIG. 3 shown undergoing a CCW displacement.

FIG. 4b shows the inclinometer undergoing a 30° CW or positive change in inclination from horizontal position 43. However, after the 30° CW rotation, but before the final output reading is taken, the actuator is activated and the assembly 41 is rotated through an angle δ° in the CW or positive direction followed by an angular displacement of δ° in the CCW or negative direction such that the assembly 41 again rests against stop 36. During this actuator induced motion, the speed of relative angular displacement may be controlled by a combination of the actuator 33, the spring 35 and damper 34. In this case, the distance "y" 42 increases and then returns to the same value as in FIG. 4a. It is preferred that the angular displacement is equal to or larger than the maximum angular error normally resulting from hysteresis when no corrective action is taken. Alternatively, the sequence of CW followed by CCW relative displacements of δ° of the sensing unit may be induced prior to obtaining the final reading regardless of the direction of the rotation of base 31.

Figure 5:
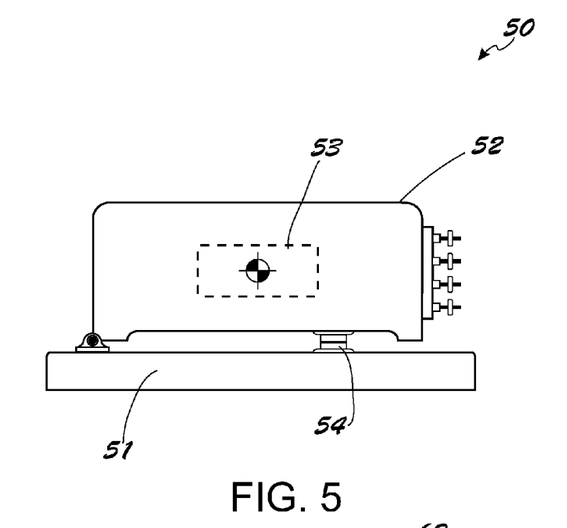
FIG. 5 is a schematic of a further embodiment of a displacement sensor wherein an actuator is used to induce vibration of the sensing unit relative to the sensor base.

FIG. 5 shows an inclinometer 50 with base 51 and assembly 52 comprising the sensing unit 53. In this embodiment, the actuator 54 oscillates or vibrates the assembly 52 relative to the base 51 at a predetermined frequency and amplitude. Output readings are preferably taken at the same point in time during the period of oscillation or vibration. In this embodiment, the actuator 54 is preferably attached to both base 51 and assembly 52.

Figure 6A:
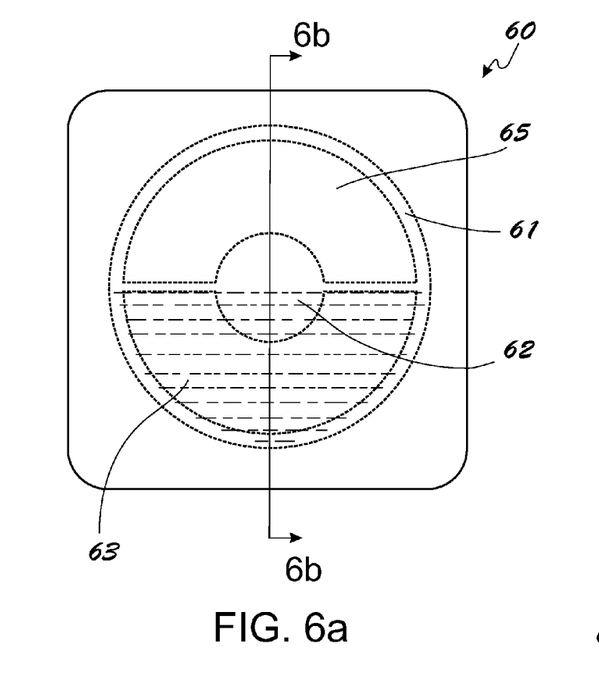
FIG. 6a is a schematic of a side view cross section of a sensing unit of an inclinometer comprising a conductive liquid.
Figure 6B:
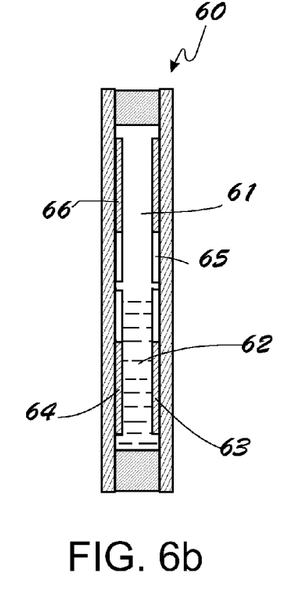
FIG. 6b is a schematic of an end view cross section of a sensing unit of an inclinometer comprising a conductive liquid.

FIG. 6a shows a schematic of an inclinometer sensing unit 60 that may be used in inclinometers such as illustrated in FIG. 2 or FIG. 3. The sensing unit comprises a vessel 61 partially filled with a conductive liquid 62 and dielectric coated wall segments 63 and 65. FIG. 6b shows a section view of the sensing unit. In the position shown, the conductive liquid 62 completely covers the lower dielectric coated wall segments 63 and 64. The conductive coated wall segments 65 and 66 are not covered by the conductive liquid. In FIGS. 6a and 6b, the capacitances between each of the wall segments 63 and 64 and the liquid are at a maximum value, while the capacitances between each of the wall segments 65 and 66 and the liquid are at their minimum value.

During use of this sensing unit in a displacement sensor, the vessel walls including the conductive wall segments 63, 64, 65 and 66 are preferably maintained in a predetermined or fixed relationship relative to the sensor base when the output reading is obtained. These elements remain fixed relative to the base of the sensor unless moved by, for example, actuator 25 in FIG. 2. It is further preferred that the net relative movement relative to the base caused by the actuator be zero prior to when a final reading of the sensing unit output is obtained.

Figure 7:
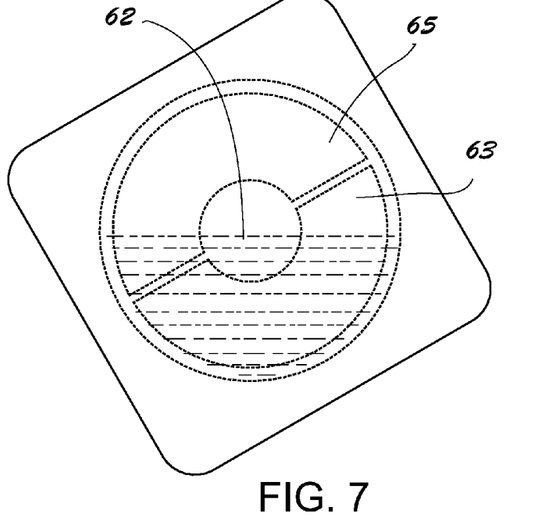
FIG. 7 is a schematic of the sensing unit of FIG. 6a and FIG. 6b displaced 30° in the CCW direction.

FIG. 7 shows the sensing unit of FIG. 6a after it has undergone a 30° CCW angular displacement from the horizontal position shown in FIG. 6a. As a result, the lower plates 63 and 64 (not shown) are partially uncovered while plates 65 and 66 (not shown) are partially covered by liquid 62. When the sensing unit is installed in an inclinometer, such as shown in FIG. 4a, elements such as the wall segments 63, 64, 65, and 66 are constrained to move with assembly 41. The conductive liquid, although a part of the sensing unit, may move relative to the wall segments 63, 64, 65 and 66, assembly 41 and base 31.

Hysteresis in liquid filled sensing units, such as shown in FIG. 6 and disclosed in U.S. Pat. Nos. 4,503,622; 4,912,662; 5,083,383; 6,490,920; 6,516,527; and 7,886,451, is at least in part a result of surface tension of the liquid and the adhesion between the liquid and at least a portion of the wall of the vessel that contains the liquid. The impact of these attractive forces on sensor performance may be diminished by causing the induced relative motion prior to or during the reading of the output to always be in the same direction. Alternatively, the effect of hysteresis may be diminished by vibrating the sensing unit as a whole. As yet another alternative, only a portion of the sensing unit, for example the conductive liquid, may be directly moved or agitated independently of the motion of the remainder of the sensing unit.

Figures 8A, 8B:
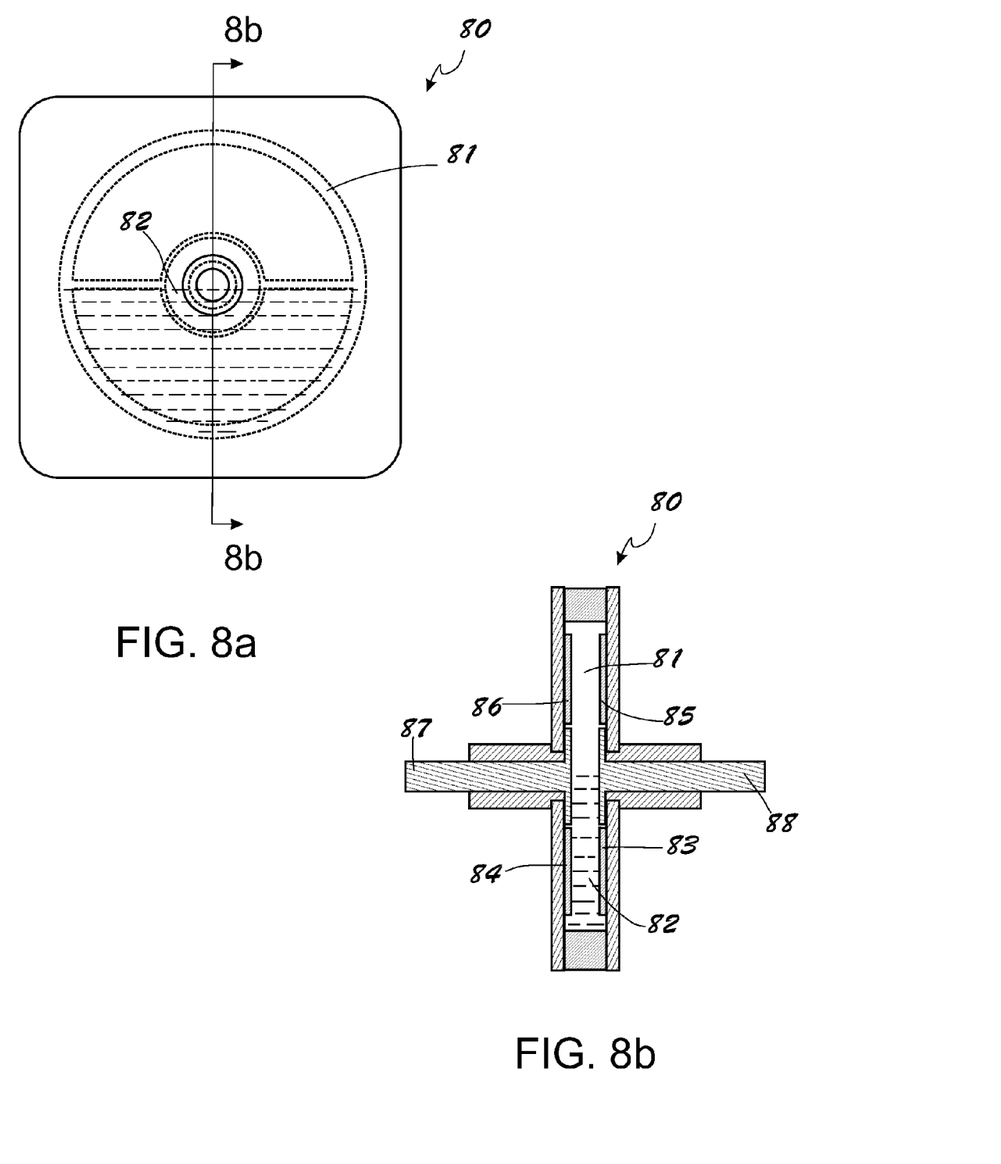
FIG. 8a is a schematic of a side view cross section of a sensing unit with agitators for agitating a liquid component contained within the sensing unit.
FIG. 8b is a schematic of an end view cross section of a sensing unit with agitators for agitating a liquid component contained within the sensing unit.

FIG. 8a shows a sensing unit 80 with vessel 81 partially filled with liquid 82. FIG. 8b shows a section of the sensor with conductive wall segments 83, 84, 85, and 86. Also shown are two pistons 87 and 88 that may be moved axially inward with axial actuators (not shown). The axial motion of these pistons is preferably initiated before the final sensor reading is obtained and after the inclinometer containing the sensing unit has reached the position where a measurement is to be obtained. The disturbance induced by pistons 87 and 88 may also be oscillatory and continue even during the period when a measurement is taken. Alternatively, the liquid may be agitated by imparting motion or oscillations to a wall of the vessel that is configured to be flexible. Devices to directly cause a disturbance in the liquid may be used in conjunction with devices to induce a desired relative motion to the sensing unit as a whole relative to the base.

Figure 9:
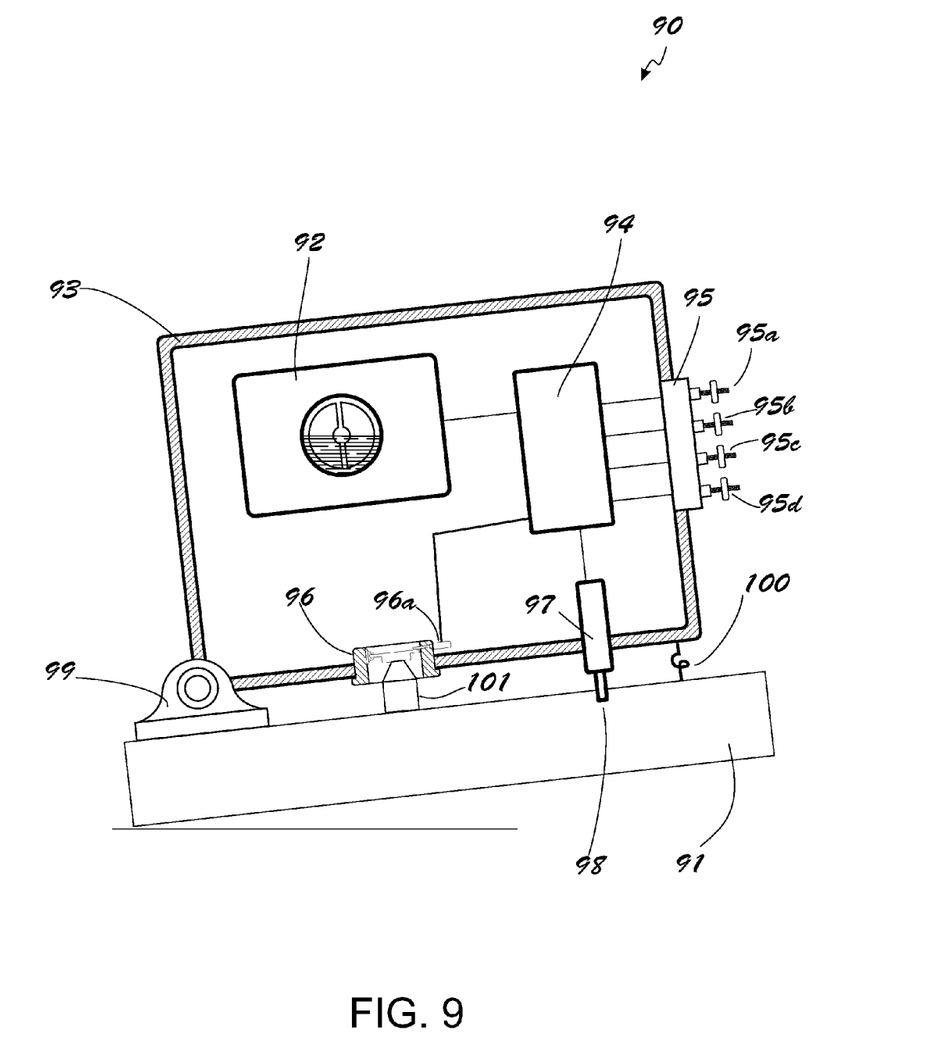
FIG. 9 is a schematic of a still further embodiment of the invention showing a sensor comprising a sensing unit and controller.

FIG. 9 shows a schematic of an inclinometer 90 configured according to yet another embodiment of the invention, comprising a sensor base 91, sensing unit 92 and assembly 93. The assembly 93 also comprises a controller 94, terminal strip 95, contact 96, and an actuator 97 with plunger 98. The movement of the assembly 93 relative to the sensor base 91 is constrained by hinge 99, spring 100, and stop 101. When assembly 93 approaches base 91 sufficiently so that contact 96 touches stop 101, the relative motion of assembly 93 towards base 91 typically ceases. However, contact 96 may be configured so that assembly 93 may be permitted to move closer to base 91 than this point.

The controller is connected to a power terminal 95a and ground terminal 95b. The controller supplies power and monitors the sensing unit 92, the actuator 97, and input terminal 95c. Based on the output of the sensing unit 92, input commands obtained from terminal 95c and on-board algorithms or empirical data, the controller causes the actuator to induce relative motion between the assembly 93 and base 91.

The controller obtains the output from the sensing unit 92 after or during the induced motion and supplies an appropriate signal indicative of the inclination of base 91 to the output terminal 95d.

Contact 96 may be configured so that the controller may determine if there is physical contact between the stop 101 and contact 96. The device may also be configured so that the contact 96 may be disabled if it is desired so that the assembly 95 may move closer to the base than the stop would otherwise permit. The contact device may be configured with a disabling mechanism 96a so that the controller may disable the contact device so that it does not engage the stop 101. In the embodiment in FIG. 9, if contact 96 is disabled by the controller, the motion of the assembly will be constrained by only hinge 99, actuator 97 and spring 100.

The plunger 98 of actuator 97 may be attached to base 91 so that the actuator can be used to push or pull on the base 91. Alternatively, the actuator may then be used to induce vibratory relative motion, instead of or in addition to oscillatory motion between the assembly and the base.

Figure 10:
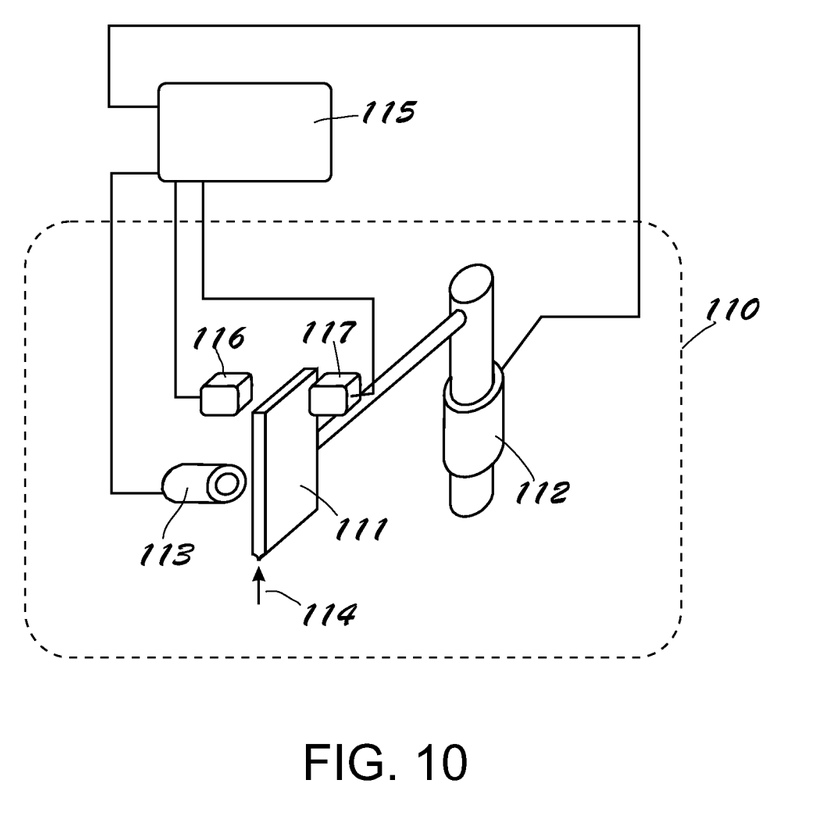
FIG. 10 is a schematic of a sensing unit comprising a servo inclination sensor with actuators configured according to another embodiment of the invention.

FIG. 10 shows a servo inclination sensing unit 110 comprising a pendulum mass 111, motor 112 and proximity sensor 113 arranged in a conventional fashion. This is another example of a sensing unit that may be used in a displacement sensor built according to this invention. Conventionally, when a sensing unit 110 is inclined, the position of the pendulum mass is altered as a result of the realignment of the mass 111 relative to the direction of the gravitational field. The motor 112 then realigns the position of the mass 111 as measured by the proximity sensor 113 so that the position is returned to the undisturbed position 114 based on commands from the controller 115. The current supplied to the motor is proportional to and used as a measure of the displacement of the sensing unit 110.

To minimize or eliminate the effect of hysteresis, an actuator (not shown) may be used to alter the angular position of the normally stationary motor 112 or the mass 111 so that the motion of the pendulum mass always approaches the null position 114 from the same direction regardless of the direction of the overall sensor displacement. Alternatively, instead of using an actuator to modify the position of a normally fixed component of the sensing unit such as the motor 112, actuators 116 and 117 may be used to induce added motion in the mass 111 so that it always approaches the null point from the same direction regardless of the direction of the overall sensor displacement. Actuators 116 and 117 may be used, for example, to magnetically attract a mass 111, which may be at least partially made of iron. Alternatively, actuators 116 and 117 may be used to vibrate the mass 111 before or during the period that the output reading is obtained.

Typically, an inclinometer is sensitive to the total acceleration, i.e. the vector sum of the acceleration of gravity and the absolute acceleration of the base of the inclinometer. Therefore, inclinometers can be used to measure acceleration, preferably if held at a fixed inclination in the inertial reference frame. The output reading of an inclinometer undergoing acceleration in the inertial reference frame is proportional to the total acceleration vector perpendicular to the sensitive axis of the inclinometer. Therefore, inclinometers and accelerometers are typically interchangeable. Accelerometers may also be used as velocity sensors and absolute displacement sensors by integrating the output signal of the accelerometer.

Figure 11:
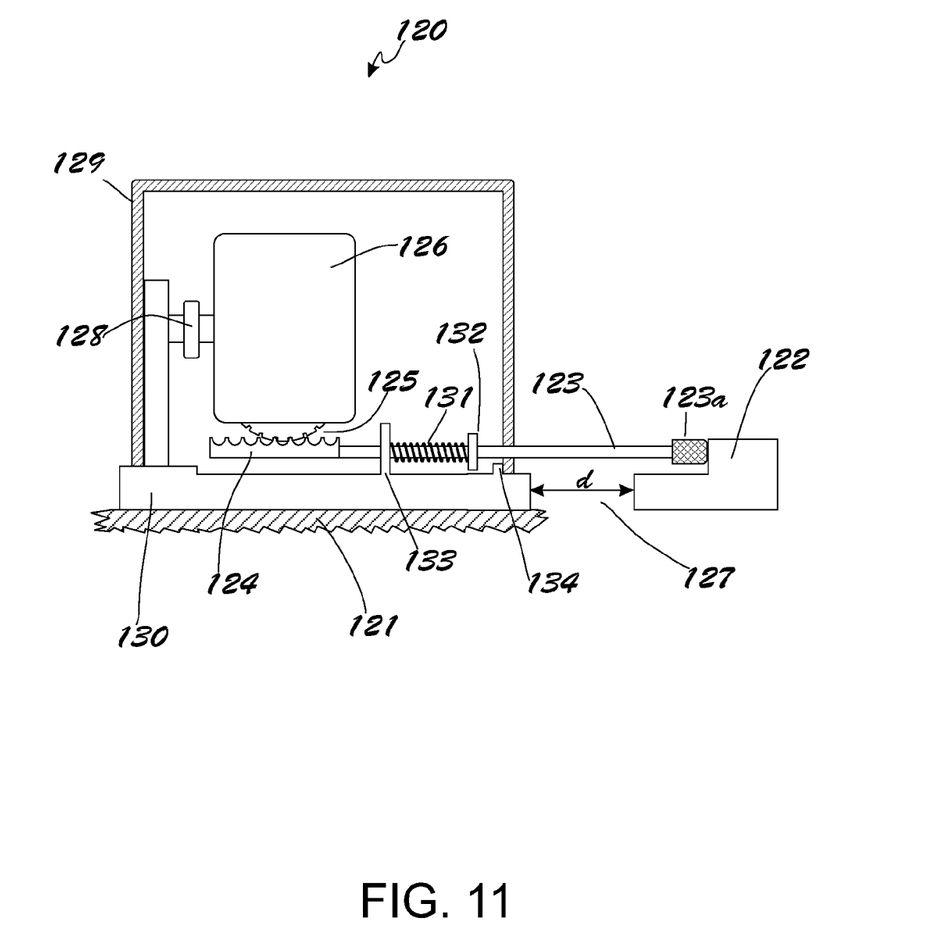
FIG. 11 is a schematic of a further embodiment of the invention with an actuator for moving the sensing unit relative to the sensor housing.

FIG. 11 shows an illustration of a relative displacement sensor 120 configured to measure the relative distance between points on two separate objects 121 and 122. The sensor 120 comprises a reciprocating probe 123 with a knurled contact tip 123a, a rack 124, a pinion 125 and a sensing unit 126. The position of reciprocating probe 123 relative to pinion 125 is a function of distance "d" 127 between points on objects 121 and 122. The position of probe 123 is detected by sensing unit 126. The measurement of distance "d" 127 or a change in this distance is displayed by the sensing unit 126 by means of a display unit (not shown). The sensor further comprises an actuator 128 that is configured to move the sensing unit relative to the housing 129 or base 130 of the sensor. The actuator is further configured to move the sensing unit in such a manner so that the measurement of "d" is always changing in the same manner, for example is always decreasing, before the final reading is taken. The sensor 120 also comprises a spring 131, a probe flange 132, a base flange 133 and a probe stop 134 configured to limit and constrain the motion of the probe 125.

The invention has been described in terms of functional principles and illustrations of specific embodiments. Embodiments described herein, including descriptions of the figures, are merely intended as exemplary, but the concept of the invention is not limited to these embodiments. The following claims are not limited to or by the described illustrative embodiments, figures, and stated objectives of the invention or the abstract. Furthermore, various presently unforeseen or unanticipated combinations of the disclosed embodiments, or their elements, or alternatives, variations or improvements which may become apparent to those of skill in the art are also intended to be encompassed by the following claims. It should be understood that the ensuing claims are intended to cover all changes and modifications of the illustrative embodiments that fall within the literal scope of the claims and all equivalents thereof.

What is claim is:

1. An inclinometer comprising:
   an inclination sensing unit;
   a base;
   an actuator configured to impart relative motion between said sensing unit and said base.

2. The sensor according to claim 1 wherein an inclination measurement is obtained after said relative motion has ceased.

3. The sensor according to claim 1 wherein an inclination measurement is obtained during a time period said controlled motion occurs.

4. The sensor according to claim 1 wherein said sensing unit comprises a liquid.

5. The sensor according to claim 4 wherein said liquid is conductive.

6. The sensor according to claim 4 wherein said liquid is nonconductive.

7. The sensor according to claim 4 wherein the capacitance between said liquid and at least a portion of the vessel wall containing the liquid is measured.

8. The sensor according to claim 4 wherein the electrical resistance between two points in said liquid is measured.

9. A method of measuring inclination of a surface comprising:
   providing an inclination sensing unit configured with a base;
   placing said base against said surface, wherein the surface has a measure of inclination;
   inducing relative motion between said sensing unit and said base wherein the relative motion is constrained;
   obtaining a measurement of the inclination of the surface from said sensing unit.

10. The method of claim 9 wherein said sensing unit comprises a liquid.

11. The method of claim 10 wherein said sensing unit comprises a conductive liquid.

12. The method of claim 11 wherein said liquid is an electrolyte.

13. The method of claim 10 further comprising agitating said liquid.

14. The method of claim 13 wherein said liquid is agitated using an agitator that is in direct contact with said liquid.

15. The sensor according to claim 1 wherein the inclination sensing unit comprises a vessel at least partially filled with a liquid.

16. The sensor according to claim 15 wherein at least a portion of a surface of the vessel in contact with the liquid is selected from the group consisting of a hydrophobic surface, a super-hydrophobic surface, and a hydrophilic surface.

17. The sensor according to claim 15 wherein the liquid contacts at least a portion of the vessel wall wherein the contact angle is greater than 100 degrees.

18. The sensor according to claim 15 wherein the liquid contacts at least a portion of the vessel wall wherein the contact angle is greater than 150 degrees.

19. The sensor according to claim 15 wherein the liquid contacts at least a portion of the vessel wall wherein the contact angle is greater than 170 degrees.

20. A displacement sensor comprising:
    a displacement sensing unit comprising a vessel at least partially filled with a liquid;
    a base;
    wherein at least a portion of a surface of the vessel in contact with the liquid is selected from the group consisting of a hydrophobic surface, a super-hydrophobic surface, and a hydrophilic surface.

21. The sensor according to claim 20 further comprising an actuator wherein the actuator is configured to impart relative motion between said sensing unit and said base.

* * * * *